(12) United States Patent
Rantala et al.

(10) Patent No.: US 10,693,618 B2
(45) Date of Patent: Jun. 23, 2020

(54) MULTIPLEXED MESSAGING IN WIRELESS NETWORK

(71) Applicant: Nokia Technologies Oy, Espoo (FI)

(72) Inventors: Enrico-Henrik Rantala, Berkeley, CA (US); Wessam Afifi Ahmed, Berkeley, CA (US); Jarkko Kneckt, Espoo (FI); Janne Marin, Espoo (FI); Mika Kasslin, Espoo (FI); Esa Tuomaala, El Cerrito, CA (US); Olli Alanen, Espoo (FI); Sayantan Choudhury, Berkeley, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/763,655

(22) PCT Filed: Sep. 28, 2015

(86) PCT No.: PCT/US2015/052555
§ 371 (c)(1),
(2) Date: Mar. 27, 2018

(87) PCT Pub. No.: WO2017/058135
PCT Pub. Date: Apr. 6, 2017

(65) Prior Publication Data
US 2019/0052445 A1   Feb. 14, 2019

(51) Int. Cl.
*H04L 5/00*  (2006.01)
*H04W 72/12*  (2009.01)

(52) U.S. Cl.
CPC .......... *H04L 5/0094* (2013.01); *H04L 5/0037* (2013.01); *H04W 72/12* (2013.01)

(58) Field of Classification Search
CPC ..... H04L 5/0094; H04L 5/0037; H04W 72/12
See application file for complete search history.

(56) References Cited

U.S. PATENT DOCUMENTS 9,179,455 B2 * 11/2015 Park .................. H04W 72/02
2010/0290389 A1  11/2010 Hou et al. .................. 370/328
2012/0002740 A1   1/2012 Han et al. .................. 375/260
(Continued)

FOREIGN PATENT DOCUMENTS

CN    101820333 A    9/2010
CN    104185217 A   12/2014

OTHER PUBLICATIONS

International Search Report of PCT/US2015/052555, dated May 20, 2016.
(Continued)

*Primary Examiner* — Christopher M Crutchfield
*Assistant Examiner* — Tito Q Pham
(74) *Attorney, Agent, or Firm* — Harrington & Smith

(57) ABSTRACT

This document discloses a solution for carrying out narrowband communications in a wireless network. According to an aspect, a method comprises in an apparatus: detecting at least one content notification message indicating contents of each of a plurality of messages frequency-multiplexed with a discovery message to parallel sub-channels of a channel in a bi-directional wireless network; selecting autonomously a sub-channel on the basis of the detected content notification message; and acquiring a message through the selected sub-channel.

20 Claims, 5 Drawing Sheets

(56) References Cited

U.S. PATENT DOCUMENTS

| | | | |
|---|---|---|---|
| 2013/0148566 A1* | 6/2013 | Doppler | H04W 72/005 370/312 |
| 2014/0086200 A1* | 3/2014 | Seok | H04W 72/02 370/330 |
| 2014/0098724 A1 | 4/2014 | Park et al. | 370/311 |
| 2014/0301294 A1 | 10/2014 | Kwon et al. | 370/329 |
| 2015/0124677 A1* | 5/2015 | Asterjadhi | H04L 1/0025 370/311 |
| 2015/0146709 A1* | 5/2015 | Kim | H04W 16/14 370/338 |
| 2016/0143006 A1* | 5/2016 | Ghosh | H04W 74/004 370/329 |

OTHER PUBLICATIONS

Chittabrata Ghosh et al. "Random Access with Trigger Frames Using OFDMA" IEEE 802.11-15/0604r0 dated May 12, 2015.
Chittabrata Ghosh et al. "Random Access with Trigger Frames Using OFDMA" IEEE 802.11-15/0875r1 dated Jul. 13, 2015.
Alfred Asterjadhi et al. "Scheduled Trigger Frames" IEEE 802.11-15/0880r2 dated Jul. 4, 2015.
Tim Godfrey et al. "Integrated Long Range Low Power Operation for IoT" IEEE 802.11-15/0775r1 dated Jul. 15, 2015.
Jonathan Segev et al. "Aggregated Probe Response" IEEE 802.11-12/0538r4 dated May 17, 2012.
Robert Stacey "IEEE P802.11 Wireless LANs" IEEE 802.11-15/0132r7 dated Jul. 20, 2015.
Jarkko Kneckt "802.11ai-Improving WLAN System Performance" IEEE 11-13/1325r5 dated Nov. 6, 2013.

* cited by examiner

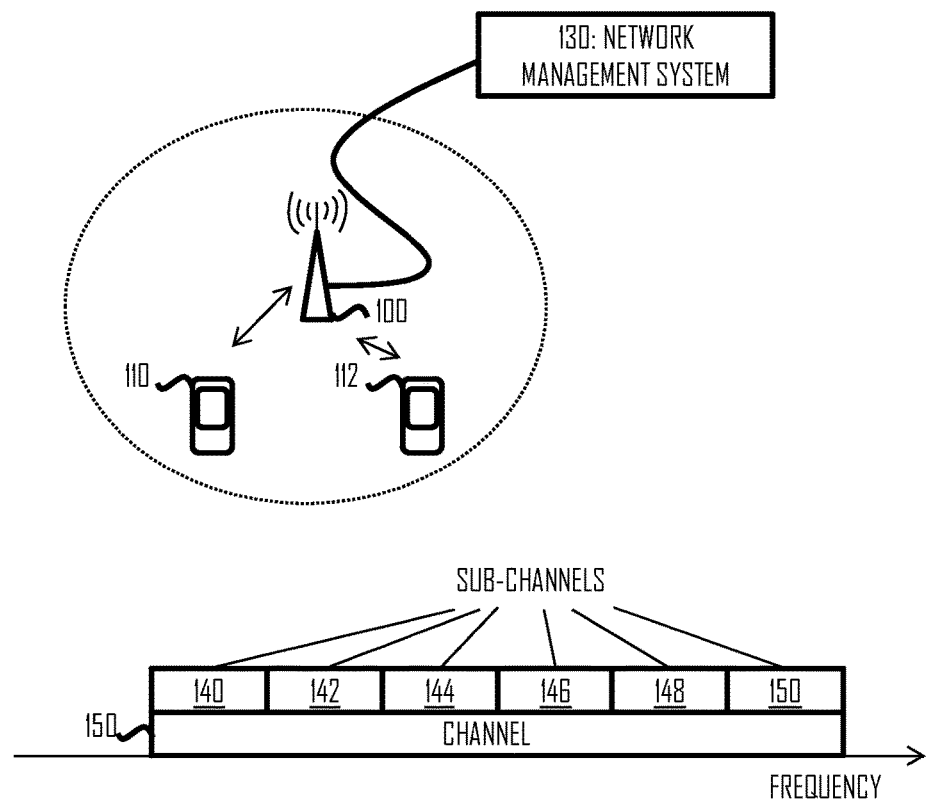
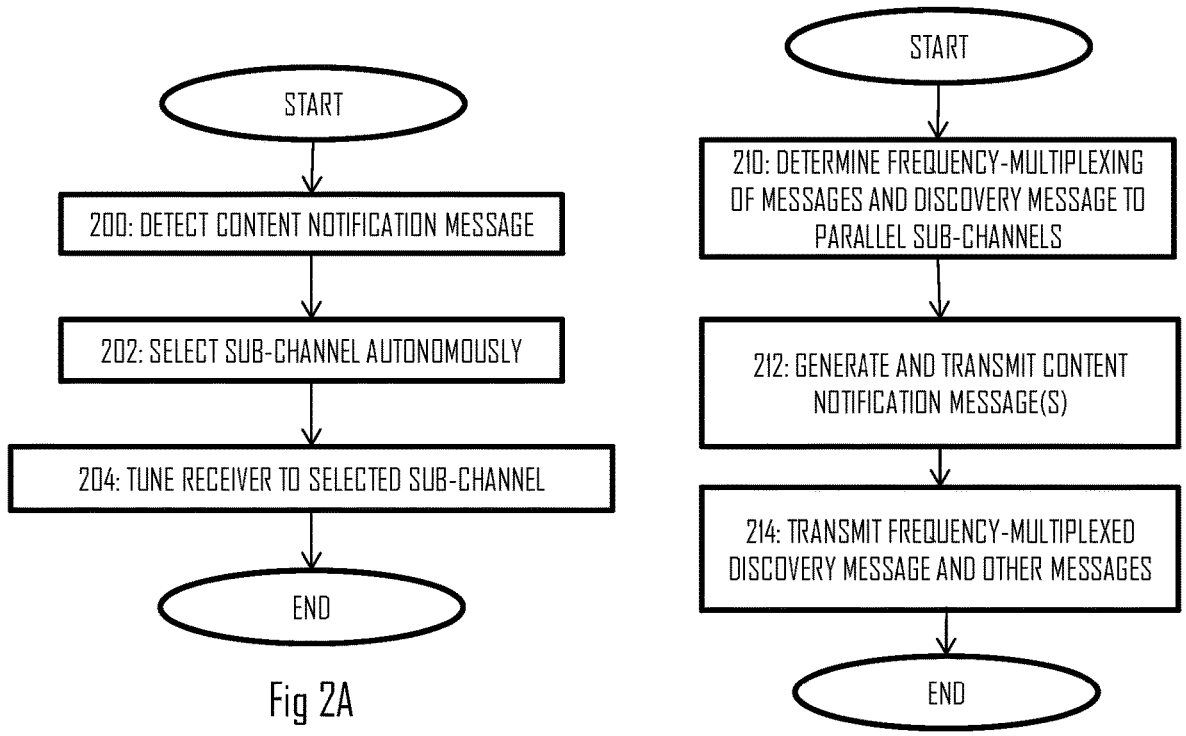
Fig 1
Fig 2A
Fig 2B

MULTIPLEXED MESSAGING IN WIRELESS NETWORK

FIELD

The invention relates to the field of wireless communications and, particularly, to multiplexing messages in a wireless network.

BACKGROUND

Increasing demand for wireless services and higher data rates sets a requirement for efficiency of wireless networks. With the increase in the number of networking devices, the number of different types of networking devices may also increase which may set new requirements for the wireless networks.

BRIEF DESCRIPTION

According to an aspect, there is provided the subject matter of the independent claims.

Embodiments of the invention are defined in dependent claims.

LIST OF DRAWINGS

Embodiments of the present invention are described below, by way of example only, with reference to the accompanying drawings, in which FIG. 1 illustrates an example of a wireless communication scenario to which embodiments of the invention may be applied;

FIGS. 2A and 2B illustrate flow diagrams of processes for carry out narrowband communication in a wireless network according to an embodiment of the invention;

DESCRIPTION OF EMBODIMENTS

Figure 3:
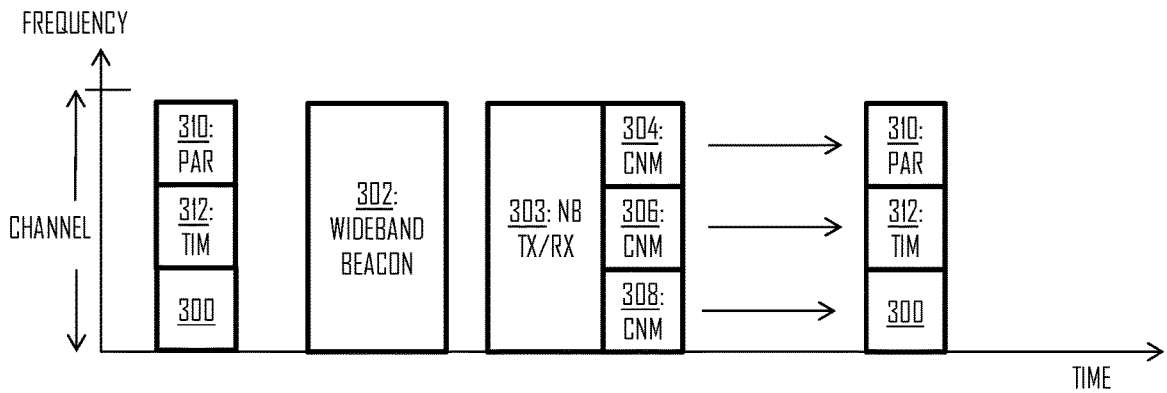
FIGS. 3 to 5 illustrate some embodiments for transmitting a content notification message.

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

A general wireless communication scenario to which embodiments of the invention may be applied is illustrated in FIG. 1. FIG. 1 illustrates wireless communication devices comprising an access points (AP) 100 and a plurality of wireless terminal devices (STA) 110, 112. The access point may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP. The AP 100 may also provide access to other networks, e.g. the Internet. In another embodiment, the BSS may comprise a plurality of APs to form an extended service set (ESS). In yet another embodiment, a terminal device 110 may establish and manage a peer-to-peer wireless network to which one or more other terminal devices 112 may associate. In such a case, the peer-to-peer wireless network may be established between two terminal devices and, in some embodiment, the terminal device managing the network may operate as an access node providing the other terminal device(s) with a connection to other networks, e.g. the Internet. In other embodiments, such routing functionality is not employed and the connection terminates in the terminal devices. Such a peer-to-peer network may be utilized for data sharing or gaming, for example.

The access node 100 may be connected to a network management system (NMS) 130 which may comprise an apparatus configured to maintain channel usage information of wireless networks of one or more access nodes and to configure the channel usage of the wireless networks. For example, it may arrange wireless networks located close to each other to operate on different channels and, thus, avoid interference between the networks. An example scenario is that access nodes of an enterprise are all controlled by the same NMS 130. In an embodiment, the network management system 130 is comprised in one of the access nodes, e.g. in the access node 100. In another embodiment, the network management system is realized by an apparatus different from the access nodes, e.g. by a server computer to which the access nodes may connect via a wired or wireless connection.

While embodiments of the invention are described in the context of the above-described topologies of IEEE 802.11 specifications, it should be appreciated that these or other embodiments of the invention may be applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards. Some embodiments may be applicable to networks having features defined in the IEEE 802.19.1 specification.

IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac amendment extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. FIG. 1 illustrates such a channel 150 which, in one embodiment, is a 20 MHz channel of an 802.11 network. The channel 150 may be a primary channel, for example.

IEEE 802.11ax task group has started activity to specify high-efficiency wireless networks and an evolution version of the WLAN. IEEE 802.11ax task group may allow narrowband transmissions on sub-channels of the above-described channels. FIG. 1 illustrates an example of such sub-channels 140 to 150 that may define a sub-channel structure within the channel 150. The channel may be the primary channel, or any one of the secondary channels of the wireless network. In some embodiments, the wireless network may employ dynamically either the whole channel 150 in transmissions or one or more sub-channels 140 to 150. Such frequency-adaptation may improve the efficiency of the network and allow power-savings in the terminal devices 110, 112. As illustrated by FIG. 1, the channel 150 is a frequency channel, and sub-channels 140 to 150 are frequency channels as well. In an embodiment, the channel 150 is 20 MHz wide and the number of sub-channels is 10, each being 2 Mhz wide. In another embodiment, the channel 150 is 40 MHz wide and the number of sub-channels is 8, each being 5 Mhz wide. In yet another embodiment, the sub-channels may have different bandwidth. These are just examples.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP. Furthermore, some networks may employ restricted access windows (RAW) where a reduced set of wireless devices of the wireless network may carry out channel contention. The access node may define the RAW and a group of wireless devices that are allowed to attempt the channel access within the RAW. Grouping allows partitioning of the wireless devices into groups and restricting channel access only to wireless devices belonging to a specified group at any given time period. The time period may be enabled by allocating slot duration and a number of slots in RAW access. The grouping may help to reduce contention by restricting access to the medium only to a subset of the wireless devices. The grouping may also reduce the signalling overhead.

The STA (or AP) may carry out a clear-channel assessment (CCA) procedure in order to determine whether the channel is free or busy. Upon detecting radio energy that exceeds a preset threshold on the channel, the STA may determine that the channel is busy and prevent the transmission. On the other hand, if the STA detects no radio energy exceeding the threshold on the channel during the determined time period, it may carry out the transmission. The STA may use a single threshold in the CCA procedure but, in some embodiments, a plurality of thresholds and frame detection are applied. Upon detecting a transmission on the channel, the STA may determine whether the ongoing transmission is a frame header or frame payload portion. An example of the frame header is a physical layer convergence protocol (PLOP) header, while an example of the frame payload portion is a physical layer service data unit (PSDU). Then, the STA may determine a threshold for use with the detected transmission. For example, a first threshold may be applied to the frame header while a second, different threshold may be applied to the frame payload portion. The first threshold may be denoted by a carrier sensing header threshold, while the second threshold may be denoted by a carrier sensing data unit threshold. By default, the carrier sensing data unit threshold may be −62 decibels with respect to one milliwatt (dBm), while the carrier sensing header threshold may be −82 dBm. Accordingly, the STA may be more sensitive with respect to frame headers than with respect to frame payload portions. This ensures that the headers will less likely collide with other impending transmissions, while spatial reuse of the channel is encouraged for payload portions. According to another aspect, a channel may be considered busy if the STA is able to decode a PLOP header when a signal is detected with power level between −82 dBm and −62 dBm, and the channel may be considered busy if a signal with power level above −62 dBm is detected even if the STA is not able to decode the PLOP header.

A virtual carrier sensing function is provided by the provision of a network allocation vector (NAV) which is used to reserve a channel for the duration of the TXOP. Most of the transmitted frames comprise a duration field which can be used to reserve the medium, or provide duration of the NAV protection, for the duration indicated by the value of the duration field. In practice, the NAV is a timer that indicates the amount of time the medium will be reserved. In a typical operation, the transmitting station (STA) will set the value of the duration field according to the time for which it expects to use the medium while all receiving STAs, except the intended receiver, update their NAV appropriately with the information in the duration field and count down from the NAV to zero before starting the channel contention. The virtual carrier sensing function indicates that the medium is busy when NAV is non-zero and idle when NAV is zero. The NAV may be set to protect frame transmissions. The communication devices obtain the NAV on the primary channel of the BSS.

With respect to the definition of the wireless network in the context of the present description, the wireless network may comprise a single BSS or a plurality of BSSs. According to a viewpoint, the wireless network may comprise a plurality of BSSs that have the same service set identifier (SSID) the same roaming identifier, and/or the same roaming partnership.

A terminal device 110, 112 may establish a connection with any one of the access nodes it has detected to provide a wireless connection within the neighbourhood of the terminal device. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

The terminal devices 100, 112 may discover the access node 100 through a network discovery process. IEEE 802.11ai task group defines principles for fast initial link setup (FILS). One aspect of the principles is to enable faster and more precise AP and network discovery. Some principles relate to passive scanning in which a scanning device, e.g. a STA, passively scans channels for any beacon, management, or advertisement frames. Other principles relate to active scanning in which the scanning device actively transmits a scanning request message, e.g. a Probe Request message or a generic advertisement service (GAS) request, in order to query for present APs or networks. The probe request may also set some conditions that a responding device should fulfil in order to respond to the probe request. In some embodiments, the scanning device may be called a requesting device or a requesting apparatus. Responding devices may transmit scanning response messages, e.g. Probe Response messages, in response to the scanning request message, wherein the scanning response message may contain information on the responding device, its network, and other networks. Embodiments of the scanning enhancements described herein encompass the network discovery signalling, probe request-response processes, as well as GAS request-response processes.

Adaptive use of narrowband and wideband transmissions on the channel 150 may result in sub-optimal spectrum use. Some embodiments of the invention provide a solution to such a problem. FIGS. 2A and 2B illustrate flow diagrams of processes according to such embodiments. FIG. 2A illustrates a process carried out by an apparatus suitable for the terminal device 110, 120 or an apparatus in the terminal device 110, 112. FIG. 2B illustrates a process executed in an access node 100.

Referring to FIG. 2A, the process comprises: detecting, by an apparatus, at least one content notification message indicating contents of each of a plurality of messages frequency-multiplexed with a discovery message to parallel sub-channels of a channel in a bi-directional wireless network; selecting, autonomously by the apparatus, a sub-channel on the basis of the detected content notification message; and acquiring, through a receiver, a message from the selected sub-channel.

In an embodiment of FIG. 2A, the terminal device receives, after step 204 for at least a time period, only the sub-channel it has selected and meanwhile omits reception of other sub-channels.

In another embodiment of FIG. 2A, the terminal device may select and receive a plurality of sub-channels concurrently for at least said time period. The plurality of sub-channels may form a subset of all the sub-channels of the channel.

Referring to FIG. 2B, the process comprises: determining, in an access node of a bi-directional wireless network, to frequency-multiplex a plurality of messages with a discovery message to parallel sub-channels of a channel of the wireless network; generating, by the access node, at least one content notification message indicating contents of each of the plurality of messages and causing transmission of the content notification message in the wireless network; and causing transmission of the plurality of messages and the discovery message as frequency-multiplexed to the parallel sub-channels.

In an embodiment, a sub-channel such as one of the sub-channels 140 to 150 is used for transmitting a narrowband beacon signal. As shown in FIG. 1, the sub-channel carrying the narrowband beacon signal reserves only a subset of frequency resources of the channel 150. Some embodiments of the invention configure the access node 100 utilize the remaining frequency resources to transmit other information. The access node 100 may frequency-multiplex to the remaining sub-channels information that is not mandatory to receive, at least not every time when the information is transmitted, by any terminal device 110, 112 but that the terminal device 110, 112 may autonomously choose which, if any, information to receive. The decision may be made on the basis of the content notification message transferred before the actual information, as described above.

Figure 4:
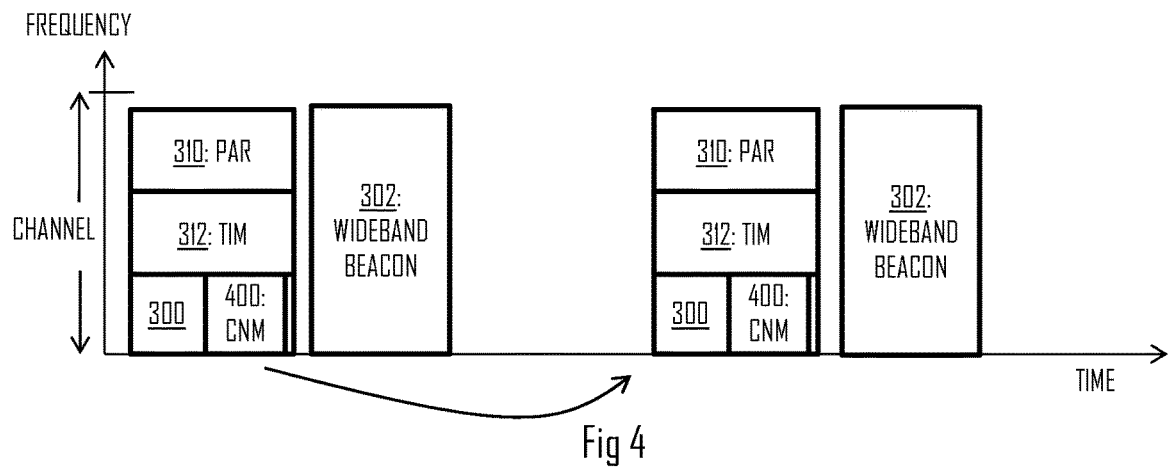
Figure 5:
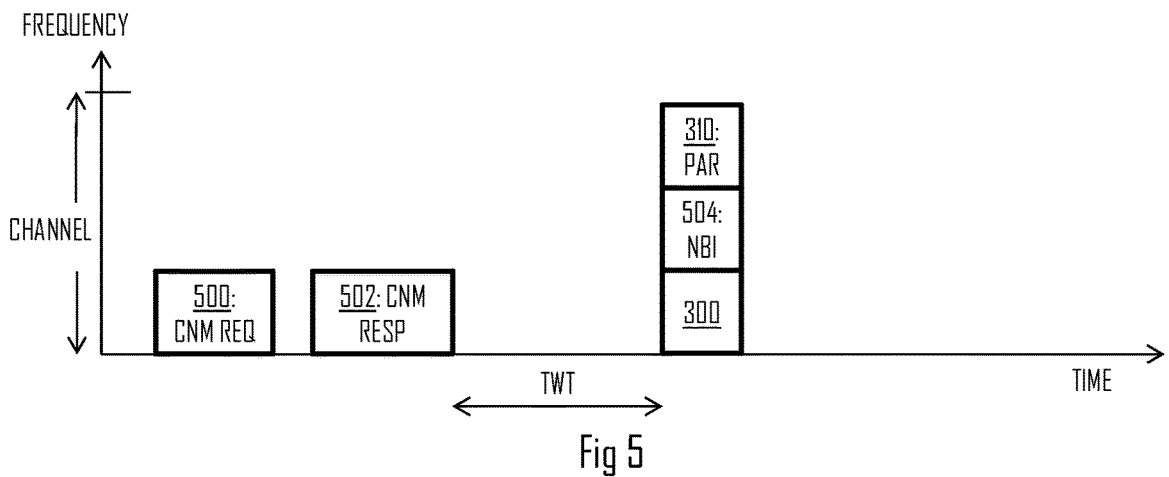

Let us now describe some embodiments of the above-described processes with reference to FIGS. 3, 4, and 5. Referring to FIG. 3, the access node may transmit a narrowband discovery message 300 on a sub-channel of the channel 150. The narrowband discovery message may be receivable by terminal devices supporting only sub-channel operation and/or by terminal devices supporting both sub-channel communication and wideband communication on the channel 150. The access node may further transmit a wideband discovery message 302 which may be, for example, a wideband beacon signal. The wideband discovery message 302 may be receivable by terminal devices supporting only wideband communication on the channel 150 and/or terminal devices supporting both sub-channel communication and wideband communication on the channel 150. The discovery message 300 may be a narrowband beacon signal, for example. Other types of discovery messages transmitted by the access node may include scanning messages such as a probe response or a GAS response, and a measurement pilot frame. The access node may transmit the beacon(s) 300, 302 periodically or non-periodically.

In an embodiment, the narrowband discovery message 300 is a short message enabling the terminal devices to discover the wireless network of the access node or to maintain connection with the access node. In an embodiment, the narrowband discovery message carries an identifier of the wireless network, e.g. SSID. In an embodiment, the narrowband discovery message may comply with the beacon discussed by IEEE 802.11ai task group, and it may comprise a high-efficiency physical layer (HE-PHY) header. In an embodiment, the access node may carry out channel contention according to the EDCA procedure before transmitting the discovery message(s) 300, 302. In another embodiment, the access node transmits the discovery message(s) without contention in connection with another frame, e.g. after transmitting the other frame. An inter-frame space may be provided between the prior frame and the discovery message 300, 302. The inter-frame space may be nine microseconds, for example.

In another embodiment, the narrowband discovery message 300 comprises a narrowband indicator (see 504 in FIG. 5) indicating the subsequent resources for carrying out narrowband transmissions 303, e.g. narrowband random access transmissions. The resources may be called a narrowband transmission opportunity (NB-TXOP). In an embodiment, the narrowband indicator indicates the subsequent resources reserved exclusively for narrowband transmissions. In another embodiment, the narrowband indicator indicates the subsequent resources available for narrowband transmissions and, in some embodiments, available also for wideband transmissions on the whole channel (and optionally on another channel or channels). The information element may indicate the transmission resources by specifying a target wait time (TWT) counted from the end of the discovery message 300 to the beginning of a transmission period reserved for narrowband transmissions 303. As illustrated in FIG. 3, one or more frames may be transmitted between the discovery message 300 and the transmission timing 303 indicated in the discovery message 300. The TWT may specify time duration between 100 and 1000 milliseconds, for example. An embodiment of the transmission procedure within block 303 is described below in connection with FIG. 8.

In an embodiment, the access node may trigger the start of the narrowband transmission opportunity by transmitting a trigger frame at the beginning of the narrowband transmission opportunity 303.

With the knowledge of the transmission timing reserved for narrowband transmissions, the terminal device(s) 110, 112 operating narrowband transmissions may enter a sleep mode until the transmission timing 303 is reached. As a consequence, collisions between narrowband and wideband transmissions may be reduced and power consumption of terminal devices may be improved.

In this embodiment, the above-described content notification message(s) 304, 306, 308 is/are transmitted in connection with the resources reserved for the narrowband transmissions 303, e.g. after the reservation has ended. The content notification messages 304 to 308 may indicate the contents of the messages transmitted in the frequency-multiplexed manner with the next narrowband discovery message 300. In the embodiment of FIG. 3, a content notification message transmitted on a sub-channel indicates the contents of a subsequent message transmitted on the same sub-channel. In the embodiment of FIG. 3, the message 310 comprises network parameters of the wireless network such as capability information of the access node, supported data rates of the access node, etc. Accordingly, the content notification message 304 preceding the message 310 on the same sub-channel may indicate that the contents of the message 310 comprise the network parameters. Similarly, when the message 312 comprise a traffic indication map (TIM) indicating presence of downlink data addressed to one or more terminal devices of the wireless network, the content notification message transmitted earlier on the same sub-channel may indicate that the subsequent message 312 comprises the TIM. In general, each content notification message 304 to 308 may be transmitted on the same sub-channel as a corresponding message 310, 312, 300 having its contents indicated by the respective content notification message 304, 306, 308.

In the embodiment of FIG. 3, the wideband discovery message 303 is transmitted between the narrowband discovery message and the narrowband transmission opportunity 303. In another embodiment, the wideband discovery message is transmitted at another time instant and the wideband discovery message may be provided elsewhere than between the narrowband discovery message and the narrowband transmission opportunity.

In an embodiment the TIM may comprise a TIM for a group of narrowband terminal devices supporting only the narrowband operation. Such terminal devices may be assigned to use the narrowband transmissions on the basis of close proximity to the access node 100, for example.

In an embodiment, the TIM may comprise a TIM for a group of terminal devices supporting both the narrowband operation and the wideband operation.

In another embodiment, the access node may transmit the transmission timing information on the transmission timing of the network management information in a message other than the narrowband discovery message. For example, the access node may transmit the transmission timing information as a multi-user message at an end of a narrowband transmission opportunity (NB-TXOP) of the access node. The NB-TXOP may comprise at least one other message before the multi-user message carrying the transmission timing information.

In an embodiment, the message(s) frequency-multiplexed together with the narrowband discovery message 300 comprise(s) other discovery information than comprised in the narrowband discovery message. Such discovery information may comprise timing information to a determined TXOP, capability information of the access node, for example. In general, the message(s) may comprise discovery information that is transmitted in a conventional discovery message. In other words, the information conventionally transmitted in a single wideband discovery message, e.g. a beacon message of an 802.11 network, may be distributed to the narrowband discovery message and to the message(s) frequency-multiplexed with the narrowband discovery message. Accordingly, the discovery message, e.g. the narrowband discovery message, may comprise discovery information such as a network identifier (e.g. SSID), synchronization information (e.g. a time stamp), periodicity information indicating periodicity of the narrowband beacon message, and/or a channel or a sub-channel comprising the narrowband beacon message. In an embodiment, the narrowband discovery message comprises the network identifier and the narrowband indicator. Meanwhile, the other message(s) multiplexed with the narrowband discovery message may include other discovery information such as capability information of the access node. In principle, the other message(s) may contain discovery information that is static or semi-static and that is not needed as often as the discovery information comprised in the narrowband beacon message. For example, even the periodicity information indicating periodicity of the narrowband beacon message, and/or an indicator of the channel or the sub-channel comprising the narrowband beacon message may be provided in the other message(s).

One or more of the messages may comprise grouping information indicating to what group of terminal devices (or a single terminal device) the information contained in the one or more of the messages is targeted.

In an embodiment, the message(s) frequency-multiplexed together with the narrowband discovery message 300 comprise(s) network performance information. Such information may comprise network performance statistics, a size of the wireless network, and/or traffic characteristics, for example.

In an embodiment, the message(s) frequency-multiplexed together with the narrowband discovery message 300 comprise(s) downlink data.

In another embodiment, the content notification message is transmitted as separated from the transmission timing 303 reserved for the narrowband transmissions.

FIG. 4 illustrates an embodiment where the content notification message 400 is transmitted in connection with the narrowband discovery message. In an embodiment, the content notification message 400 is comprised as an information element in the narrowband discovery message. In another embodiment, the content notification message and the discovery message are transmitted in different frames but transmitted consecutively, e.g. within the same transmission opportunity (TXOP). In the embodiment of FIG. 4, the content notification message 400 transmitted on a sub-channel may indicate contents of the subsequent narrowband messages 310, 312, 300 of all sub-channels. The content notification message 400 may be transmitted on a primary sub-channel, for example. The primary sub-channel may be defined as a channel where the access node transmits at least some control information not transmitted on other sub-channels. Such control information may comprise at least some of the discovery messages transmitted by the access node, e.g. the narrowband beacon.

In another embodiment, the content notification message is transmitted/received as comprised in an acknowledgment message transmitted by the access node.

In another embodiment, the content notification message is transmitted/received as comprised in the above-described narrowband indicator message.

In another embodiment, the content notification message is transmitted in a broadcast message.

In another embodiment, the content notification message is transmitted in a multicast message.

In another embodiment, the content notification message is transmitted in a unicast message.

In an embodiment, the content notification message comprises a bitmap identifying the contents of the subsequent narrowband messages frequency-multiplexed together with the discovery message. The bitmap may further indicate a sub-channel index for each subsequent narrowband message. Accordingly, a bitmap may identify both the contents of a narrowband message and a channel on which the narrowband message is available. The sub-channel index may indicate a center frequency of the sub-channel to which the terminal device may tune its receiver to receive the narrowband message.

Figure 6:
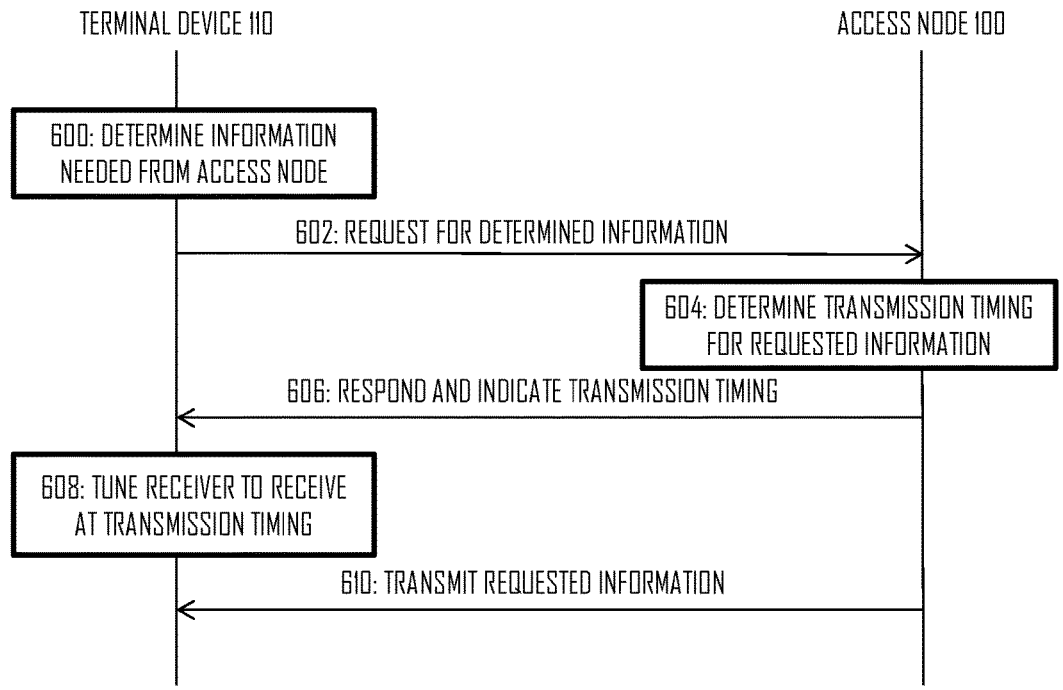
FIG. 6 illustrates a signalling diagram for a request-response procedure for providing the content notification message according to an embodiment of the invention.

FIGS. 5 and 6 illustrate yet another embodiment where the provision of the content notification message is subject to a request from the terminal device. Referring to FIGS. 5 and 6, the terminal device 110, 112 may determine that it has a need for a certain type of management information (block 600), e.g. the TIM, the network parameters, or the network performance characteristics. As a consequence, the terminal device 110, 112 may generate a content notification request message 500 and transmit the message to the access node (step 602). Table 1 below illustrates an embodiment of information elements comprised in the content notification request message 500.

TABLE 1

| HE PHY | STA Addr | IE Index | Preferred Sub-channel | Max TWT | FCS |
|---|---|---|---|---|---|

Referring to Table 1, the message may comprise a high-efficiency physical layer header (HE PHY) specified in the 802.11 specifications, an address of the terminal device (STA Addr), an index associated with the management information the terminal device is requesting (IE Index), and a frame check sequence (FCS) comprising an error detection/correction sequence. The message 500 may further comprise the following information elements that may be optional: an index of a preferred sub-channel for transmitting the requested management information, and a maximum TWT for transmitting the requested management information. The terminal device may select the preferred sub-channel on the basis of prior use of sub-channels and/or measurements made on the sub-channel(s), for example. The terminal device may select the maximum TWT on the basis of an application utilizing for the connection in the network. For example, an application having strict requirements for latency may need a shorter maximum TWT than an application having no requirements or loose requirements for the latency. For example, a certain type of sensor device may be more sensitive to latency than another sensor device and, therefore, require a shorter maximum TWT. An embodiment of such a sensor is an electrocardiogram (ECG) sensor that has more strict latency requirements than a temperature sensor. In another example, the terminal device may select the maximum TWT on the basis of amount of data buffered in the terminal device for transmission. For instance, if a buffer of the terminal device is filling up, the terminal device may select a shorter maximum TWT than in the case where the buffer contains less data. In yet another example, the selection of the maximum TWT may be based on remaining battery capacity of the terminal device. For instance, if the battery status indicates low battery capacity, the terminal device may select a shorter maximum TWT than in the case where the battery is full.

Upon receiving the content notification request message 500 in step 602, the access node may determine the transmission timing of a following narrowband discovery message with which the requested management information may be frequency-multiplexed (block 604). The access node may use the information elements indicating the preferred sub-channel and the maximum TWT, if present, as a further criterion in the determination. Upon determining the resources for transmitting the requested management information, the access node may generate a content notification response message 502 and transmit the message 502 to the terminal device (step 606). Table 2 below illustrates an embodiment of the content notification response message 502.

TABLE 2

| HE PHY | SSID | Sub-channel index | TWT | FCS |
|---|---|---|---|---|

Referring to Table 2, the content notification response message 502 may comprise the HE PHY header and a network identifier, e.g. the SSID of the wireless network of the access node. The message 502 may further comprise a sub-channel index indicating a sub-channel on which the requested management information shall be transmitted. The sub-channel index may indicate a center frequency of the sub-channel, for example. The message 502 may further comprise a TWT indicating the transmission timing of the management information (see TWT in FIG. 5).

Upon receiving the content notification response message in step 606, the terminal device may extract the sub-channel and the transmission timing from the received content notification response message and tune a receiver of the terminal device to the sub-channel at the transmission timing (block 608). In step 610, the access node may transmit the requested contents as frequency-multiplexed with a discovery signal (contents 300, 504, 310 in FIG. 5) and the terminal device may receive the requested contents on the negotiated sub-channel.

In an embodiment, the access node may select the message(s) frequency-multiplexed with the discovery message on the basis of demand from the terminal devices. For example, the access node may select at least a message type that has been requested the highest number of times. For example, if ten terminal devices have requested for the TIM while only one has requested for the access node parameters, the access node may prioritize selection of the TIM over the parameters when selecting the messages to multiplex with an upcoming narrowband discovery message.

Figure 7:
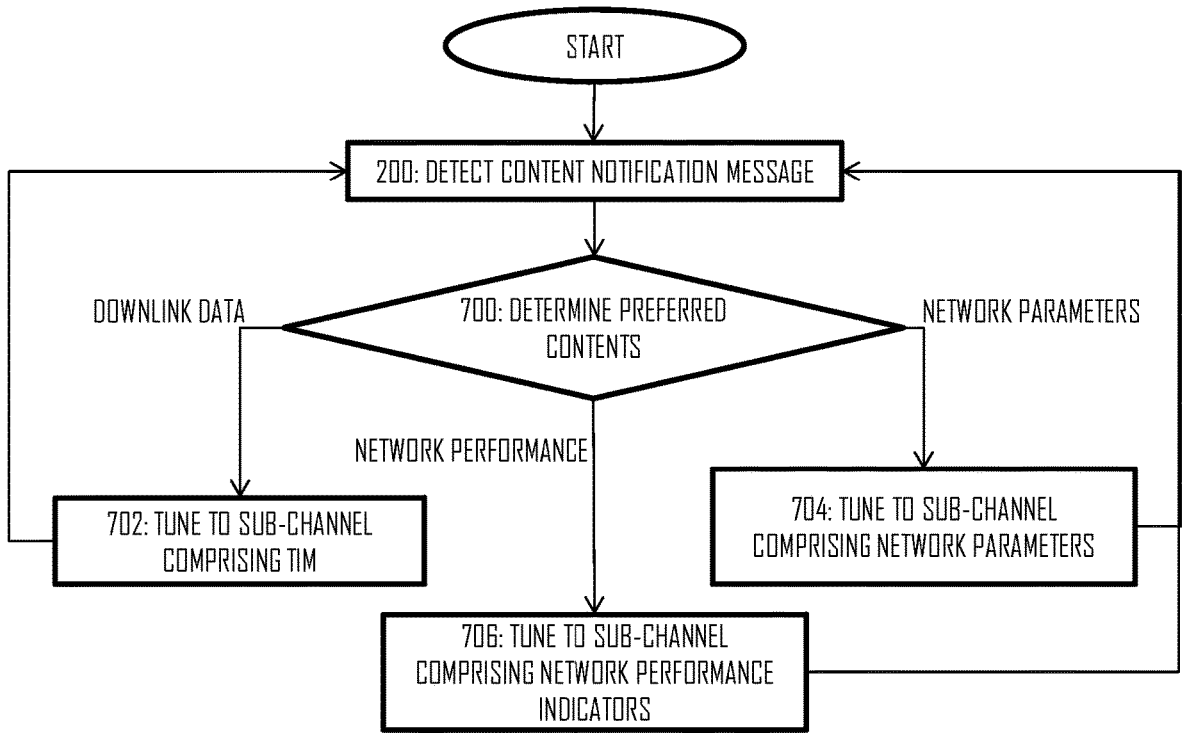
FIG. 7 illustrates a flow diagram of autonomous selection of a narrowband message to receive in a terminal device according to an embodiment of the invention.

FIG. 7 illustrates a procedure executed in the terminal device 110, 112. The terminal device may choose, on the basis of each content notification message received in the terminal device, a sub-channel on which to receive a narrowband message. At different instants, the terminal device may have a need for different type of management information or data and, therefore, the autonomous selection of the contents facilitates flexible reception of the needed information or data without increasing signaling overhead in the wireless network.

Referring to FIG. 7, the terminal device detects a content notification message in block 200. Upon determining what type of information will be available on the sub-channels parallel to the discovery message, the terminal device may select, amongst the contents indicated by the content notification message, preferred contents (block 700). In case the process of FIG. 7 is carried out in the embodiment of FIG. 3, the terminal device may detect a plurality of content notification messages in block 200 or single content notification message on a sub-channel the terminal device listens to.

FIG. 7 illustrates three examples of the type of contents indicated by the content notification message: downlink data, network performance characteristics, and network parameters. Another embodiment comprises a subset of these contents, and yet another embodiment comprises at least one further type of content. In general, the terminal device may select the preferred contents amongst the contents indicated in the content notification message(s), or it may choose not to receive any contents.

For example, in situation where the terminal device has uplink data to be transmitted but has not yet received network parameters necessary for transmitting the uplink data, the terminal device may determine that the network parameters are the preferred contents. Then, the process may proceed to block 704 where the terminal device tunes its receiver to a sub-channel indicated by the content notification message to contain the network parameters.

In another example, the content notification message may indicate that a TIM indicating presence of downlink data to the terminal device is present. Let us assume that the terminal device has already acquired necessary network parameters. Then, the terminal device may choose a sub-channel carrying the TIM (block 702).

In yet another example, the terminal device may need the network performance characteristics in a selection procedure where the terminal device chooses between two or more wireless networks. Accordingly, the terminal device may then prefer to receive the network performance characteristics and tune to the sub-channel (block 706) carrying such information indicated by the content notification message.

From each block 702 to 706, the process may return to block 200 upon receiving a new content notification message. In connection with the new content notification message, the terminal device may make a different selection than the selection made in connection with the earlier content notification message and, as a consequence, it may select a different sub-channel.

In an embodiment of FIG. 7, the terminal device may make the autonomous selection amongst a set of broadcast management messages. If the content notification message indicates that a subsequent narrowband message contains data to management information as unicast or multicast transmission to the terminal device, the terminal device may be obliged to receive such information dedicated to the terminal device. Accordingly, such dedicated information may overrule the autonomous selection.

Figure 8:
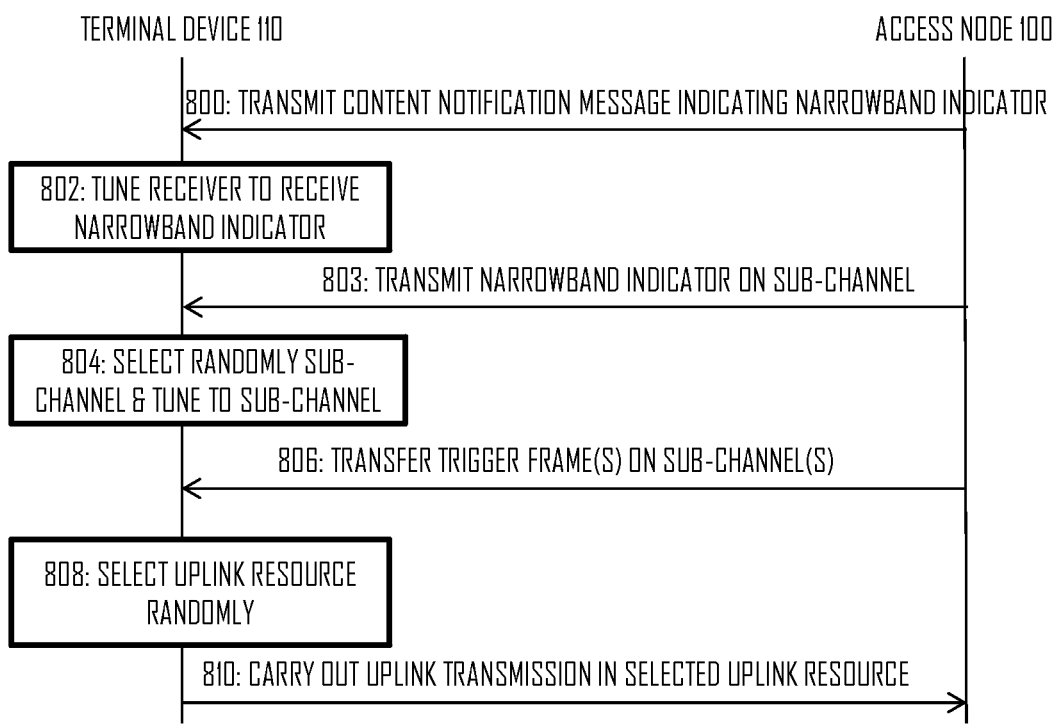
FIG. 8 illustrates a signalling diagram for uplink transmissions according to an embodiment of the invention.

FIG. 8 illustrates an embodiment of a procedure for carrying out narrowband uplink transmissions on a sub-channel in the wireless network. Referring to FIG. 8, the access node may transmit a content notification message in step 800, e.g. according to any one of the above-described embodiments. The content notification message may indicate that a narrowband indicator shall be transmitted on a determined sub-channel. Upon receiving the content notification message in step 800 and upon determining a need to transmit uplink data, e.g. on the basis of uplink data being buffered for transmission, the terminal device may tune its receiver to the sub-channel carrying the narrowband indicator (block 802). In step 803, the access node transmits and the terminal device receives the narrowband indicator on the determined sub-channel.

The terminal device may extract the narrowband indicator and, as a result, acquire a start time of a narrowband transmission opportunity. The narrowband transmission opportunity may define a time interval where all the sub-channels of the channel are reserved for narrowband transmissions.

In an embodiment, the narrowband transmissions are random access transmissions.

In another embodiment, the narrowband transmissions are other type of narrowband transmissions, e.g. scheduled transmissions.

In block 804, the terminal device selects randomly a sub-channel during the narrowband transmission opportunity and tunes its receiver to the selected sub-channel.

In step 806, the access node transmits at least one trigger frame on the sub-channels during the narrowband transmission opportunity, e.g. in the beginning of the narrowband transmission opportunity. A trigger frame may be transmitted on each sub-channel. A trigger frame may indicate time-frequency resources available for uplink transmission in the narrowband transmission opportunity. Each trigger frame may indicate the time-frequency resources on the sub-channel where the trigger frame is transmitted, e.g. a time period on the sub-channel where the trigger frame is transmitted. As described above, the trigger frame may trigger the start of the narrowband transmission opportunity on the sub-channel for a determined period of time. In another embodiment, at least one of the trigger frames may indicate time-frequency resources on another sub-channel than the one used for conveying the at least one trigger frame. For example, a trigger frame transmitted only on a primary sub-channel of a channel may trigger the narrowband transmission opportunity on all sub-channels of the channel.

Upon receiving the trigger frame in step 806, the terminal device may select one of the time-frequency resources indicated in the trigger frame (block 808). The selection may be random-based. Then, the terminal device may carry out uplink transmission in the selected time-frequency resource (step 810), and the access node may receive the uplink transmission in step 810.

Figure 9:
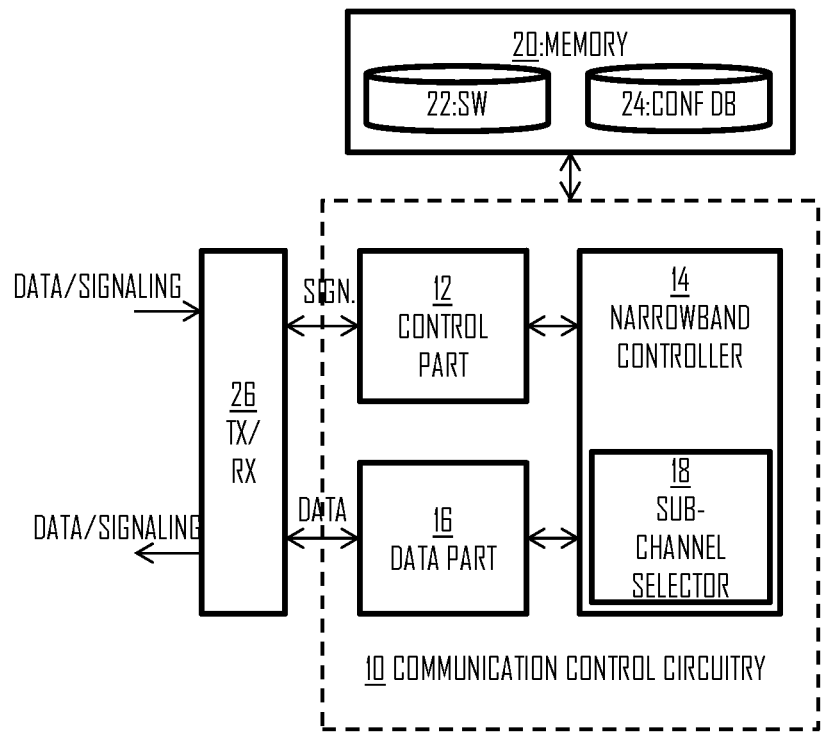
FIGS. 9 and 10 illustrate block diagrams of some embodiments of an apparatus carrying out functions related to the narrowband communications in the wireless network.

FIG. 9 illustrates an embodiment of a structure of the above-mentioned functionalities of the apparatus executing the process of FIG. 2A or any one of the embodiments performed by the terminal device 110, 112. The apparatus may be the terminal device 112, user equipment, a peer device, a group owner device, or a client device. The apparatus may comply with specifications of an IEEE 802.11 network and/or another wireless network. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in any one of the above-described devices, e.g. the terminal device 110, 112.

Referring to FIG. 9, the apparatus may comprise a communication controller circuitry 10 configured to control wireless communications in the apparatus. The communication controller circuitry 10 may configure the establishment, operation, and termination of connections or associations in the apparatus, as described above. The communication control circuitry 10 may control management of one or more wireless networks. The communication controller circuitry 10 may comprise a control part 12 handling control signalling communication with respect to transmission, reception, and extraction of control or management frames including beacon messages, request messages, response messages, scanning or probing messages, discovery messages, request-to-send (RTS) messages, and clear-to-send (CTS) messages. The control part 12 may also carry out processing of headers of data frames. The communication controller circuitry 10 may further comprise a data part 16 that handles transmission and reception of payload data when the apparatus is associated to one or more other apparatuses.

The communication control circuitry 10 may further comprise a narrowband controller 14 configured to control narrowband operations in the apparatus. In an embodiment, the apparatus may support only the narrowband operation. In another embodiment, the apparatus may support both narrowband operation and wideband operation in which case the apparatus may comprise a wideband controller (not shown). The wideband controller may control transmissions on at least one channel of the wireless network, e.g. on the primary channel. The wideband controller may also control transmissions on a plurality of channels of the wireless network, e.g. on the primary channel and on one or more secondary channels. The narrowband controller 14 may control the operation on one or more sub-channels of a channel of the wireless network.

The channel may be considered as a channel logically identified as a channel in the wireless network. A channel may be associated with a channel identifier or a channel index identifiable via signalling in the wireless network. According to one viewpoint, a sub-carrier of a multi-carrier signal may be excluded from the definition of the sub-channel.

The narrowband controller 14 may comprise a sub-channel selector 18 configured to select a sub-channel on which the apparatus shall operate. The sub-channel selector may make the sub-channel selection on the basis of the received content notification messages and configure the control part 12 to tune a transmitter/receiver to the selected sub-channel. Accordingly, the sub-channel selector 18 may carry out blocks 202, 204, 608, 700 to 706, 802, 804, 808 according to any one of the above-described embodiments. In the embodiment of FIG. 6, the sub-channel selector may carry out blocks 600 and 608 and configure the control part to carry out transmission/reception in steps 602, 606, 610. In some embodiments, the narrowband controller 14 may control the data part 16 to carry out narrowband data transmission/reception on the selected sub-channel.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise a memory 20 that stores computer programs (software) 22 configuring the apparatus to perform the above-described functionalities. The memory 20 may also store a configuration database 24 comprising communication parameters and other information needed for the wireless communications, e.g. acquired network parameters of the wireless network, acquired performance characteristics of the wireless network, etc. In some embodiments, the sub-channel selector may select the sub-channel on the basis of information stored in the configuration database or on the basis of information that is not available in the configuration database 24.

The apparatus may further comprise radio interface components 26 providing the apparatus with radio communication capabilities within one or more wireless networks. The radio interface components 26 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus comprises at least one processor 10 and at least one memory 20 including a computer program code 22, wherein the at least one memory and the computer program code are configured, with the at least one processor, to cause the apparatus to carry out the functionalities of the (terminal) device according to any one of the embodiments of FIGS. 2A, 3 to 8. According to an aspect, when the at least one processor 10 executes the computer program code, the computer program code causes the apparatus to carry out the functionalities according to any one of the embodiments of FIGS. 2A, 3 to 8. According to another embodiment, the apparatus comprises the at least one processor 10 and at least one memory 20 including a computer program code 22, wherein the at least one processor 10 and the computer program code 22 perform the at least some of the functionalities of the (terminal) device according to any one of the embodiments of FIGS. 2A, 3 to 8. Accordingly, the at least one processor, the memory, and the computer program code form processing means for carrying out embodiments of the present invention in the device. According to yet another embodiment, the apparatus carrying out the embodiments of the invention in the (terminal) device comprises a circuitry including at least one processor 10 and at least one memory 20 including computer program code 22. When activated, the circuitry causes the apparatus to perform the at least some of the functionalities of the (terminal) device according to any one of the embodiments of FIGS. 2A, 3 to 8.

Figure 10:
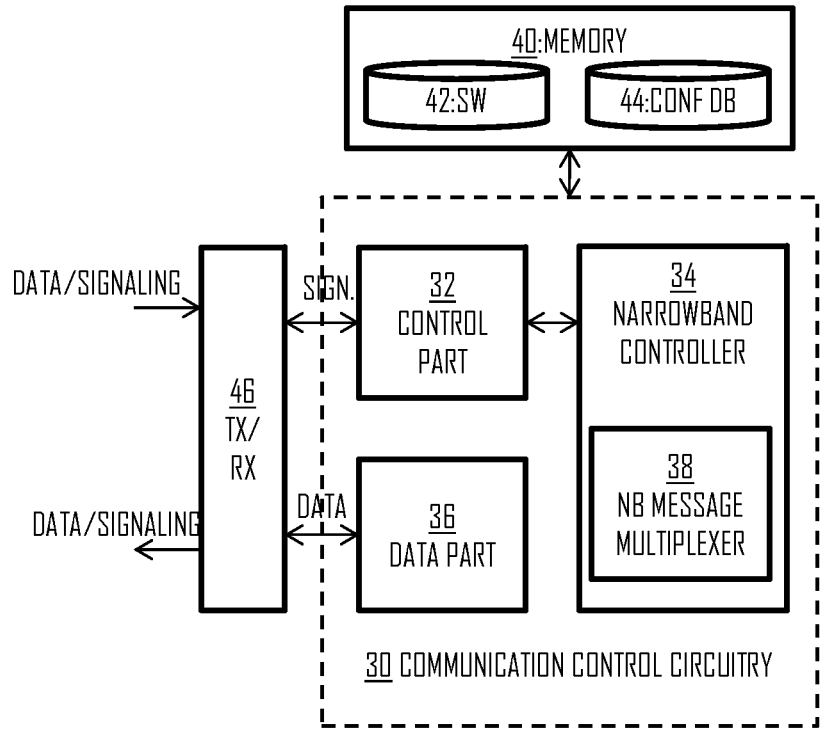

FIG. 10 illustrates an embodiment of a structure of the above-mentioned functionalities of the apparatus executing the process of FIG. 2B or any one of the embodiments performed by the access node 100. The apparatus may be the access node 100. The apparatus may comply with specifications of an IEEE 802.11 network and/or another wireless network. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, infrastructure access point, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in the access node.

Referring to FIG. 10, the apparatus may comprise a communication controller circuitry 30 configured to control wireless communications in the apparatus. The communication controller circuitry 30 may configure the establishment, operation, and termination of connections or associations in the apparatus, as described above. The communication control circuitry 30 may control management of one or more wireless networks. The operation of the communication control circuitry 30 with respect to the management of the wireless network(s) may be controlled at least partly by an external apparatus, e.g. the NMS 130. The communication controller circuitry 30 may comprise a control part 32 handling control signalling communication with respect to transmission, reception, and extraction of control or management frames including beacon messages, request messages, response messages, scanning or probing messages, discovery messages, request-to-send (RTS) messages, and clear-to-send (CTS) messages. The control part 32 may also carry out processing of headers of data frames. The communication controller circuitry 30 may further comprise a data part 36 that handles transmission and reception of payload data when the apparatus is associated to one or more other apparatuses.

The communication control circuitry 30 may further comprise a narrowband controller 34 configured to control narrowband operations in the apparatus. In an embodiment, the apparatus may support both narrowband operation and wideband operation in which case the apparatus may comprise a wideband controller (not shown). Accordingly, the apparatus is capable of serving terminal devices in a narrowband mode on a single sub-channel, a wideband mode on a channel comprising a plurality of sub-channels, and in an ultra-wideband mode on a plurality of channels.

The narrowband controller 34 may comprise a narrowband message multiplexer circuitry 38 configured to frequency-multiplex a plurality of narrowband messages to the same channel according to any one of the above-described embodiments. The multiplexed narrowband messages may comprise data frames and/or management frames frequency-multiplexed together with a discovery message. The multiplexer circuitry 38 may choose the messages on the basis of transmission periodicity of each message, demand for information comprised in each message, or according to another criterion. The multiplexing circuitry 38 may realize different frequency-multiplexing configurations at different multiplexing occasions. For example, the multiplexing circuitry may choose to multiplex data and a TIM together with the discovery message at one multiplexing occasion, and choose to multiplex network parameters and network performance characteristics together with the discovery message at another multiplexing occasion. The multiplexing circuitry 38 may also generate the contents of the content notification messages and configure the control part 32 to transmit the content notification messages. Accordingly, the multiplexing circuitry may carry out blocks 210 to 214 and 604, and cooperate with the control part 32 in steps 602, 606, 610, 800, 803, 806.

The circuitries 32 to 38 of the communication controller circuitry 30 may be carried out by the one or more physical circuitries or processors. In practice, the different circuitries may be realized by different computer program modules. Depending on the specifications and the design of the apparatus, the apparatus may comprise some of the circuitries 32 to 38 or all of them.

The apparatus may further comprise a memory 40 that stores computer programs (software) 42 configuring the apparatus to perform the above-described functionalities. The memory 40 may also store a configuration database 44 comprising communication parameters and other information needed for the wireless communications, e.g. the network parameters and network performance characteristics.

The apparatus may further comprise radio interface components 46 providing the apparatus with radio communication capabilities within one or more wireless networks. The radio interface components 46 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus comprises at least one processor 30 and at least one memory 40 including a computer program code 42, wherein the at least one memory and the computer program code are configured, with the at least one processor, to cause the apparatus to carry out the functionalities of the access node according to any one of the embodiments of FIGS. 2B, 3 to 6, and 8. According to an aspect, when the at least one processor 30 executes the computer program code, the computer program code causes the apparatus to carry out the functionalities according to any one of the embodiments of FIGS. 2B, 3 to 6, and 8. According to another embodiment, the apparatus comprises the at least one processor 30 and at least one memory 40 including a computer program code 42, wherein the at least one processor 40 and the computer program code 42 perform the at least some of the functionalities of the access node according to any one of the embodiments of FIGS. 2B, 3 to 6, and 8. Accordingly, the at least one processor, the memory, and the computer program code form processing means for carrying out embodiments of the present invention in the access node. According to yet another embodiment, the apparatus carrying out the embodiments of the invention in the access node comprises a circuitry including at least one processor 30 and at least one memory 40 including computer program code 42. When activated, the circuitry causes the apparatus to perform the at least some of the functionalities of the access node according to any one of the embodiments of FIGS. 2B, 3 to 6, and 8.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a wireless device.

The processes or methods described in connection with FIGS. 2A to 8 may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
    determining, by an apparatus at a first time instant, at least one content notification message indicating contents of each of a plurality of messages frequency- multiplexed with a discovery message to parallel sub-channels of a channel in a bi-directional wireless network, wherein the plurality of messages are different from the discovery message;
    selecting, autonomously by the apparatus, a first sub-channel on a basis of determining the at least one content notification message; and
    receiving, by the apparatus, the discovery message on the first sub-channel and omitting reception on other sub-channels, wherein the discovery message on the first sub-channel is frequency-multiplexed with the plurality of messages on the other sub- channels;
    detecting, by the apparatus at a second time instant, at least one other content notification message;
    selecting, a second sub-channel on a basis of the at least one other content notification message; and
    receiving, by the apparatus, a message different from the discovery message on the second sub-channel and omitting reception on other sub-channels.

2. The method of claim 1, wherein the plurality of messages and the discovery message are present simultaneously on the parallel sub-channels.

3. The method of claim 1, wherein the plurality of messages comprises at least one information type of the following information type set: management information on the wireless network and data.

4. The method of claim 1, wherein the discovery message comprises a narrowband indicator indicating transmission timing reserved for narrowband transmission on the channel.

5. The method of claim 1, wherein the plurality of messages comprises a plurality of different types of management information.

6. The method of claim 1, wherein the determining comprises detecting, by the apparatus, the at least one content notification message indicating at least a first content type of a first message on the first sub-channel and a second content type of a second message on the second sub-channel, wherein the second content type is different from the first content type, wherein the first message and the second message are scheduled to be transferred at least partially simultaneously, wherein the first sub-channel and the second sub-channel are frequency sub-channels of the channel; and
    wherein the selecting comprises selecting autonomously by the apparatus, a preferred sub-channel, wherein the selection is based on the first content type and the second content type indicated in the determined at least one content notification message.

7. The method of claim 1, wherein said autonomous selection by the apparatus is further based on a selection criterion internal to the apparatus, wherein the selection criterion comprises at least one selection criterion of the following selection criterion set:
    the apparatus has buffered uplink data for uplink transmission and one of the plurality of messages indicates uplink transmission timing;
    the apparatus has no knowledge of a current value of a determined parameter of the wireless network and one of the plurality of messages comprises said determined parameter;
    one of the plurality of messages comprises data addressed to the apparatus;
    the apparatus determines to check a downlink data transmission timing schedule;
    one of the plurality of messages comprises a traffic indication bitmap for a group of terminal devices to which the apparatus belongs; and
    the apparatus determines to check whether or not the traffic indication map indicates presence of downlink data buffered for the apparatus.

8. The method of claim 1, further comprising:
    detecting, by an apparatus, a second content notification message indicating contents of each of a second set of messages frequency-multiplexed with a second discovery message to said parallel sub-channels of the channel;

selecting, autonomously by the apparatus, the second sub-channel different from said first sub-channel on the basis of the determined at least one content notification message; and receiving, by the apparatus, a message from the selected second sub-channel.

9. An apparatus comprising:

at least one processor; and at least one memory including a computer program code, wherein the at least one memory and the computer program code are configured, with the at least one processor, to cause the apparatus to:

determine at a first time instant at least one content notification message indicating contents of each of a plurality of messages frequency-multiplexed with a discovery message to parallel sub-channels of a channel in a bi-directional wireless network, wherein the plurality of messages are different from the discovery message;

select autonomously a first sub-channel on the basis of the determined at least one content notification message; and acquire the discovery message through the first sub-channel and omit reception on other sub-channels, wherein the discovery message through the first sub-channel is frequency-multiplexed with the plurality of messages on the other sub-channels;

detect, by the apparatus at a second time instant, at least one other content notification message;

select, a second sub-channel on the basis of the at least one other content notification message; and receive, by the apparatus, a message different from the discovery message on the second sub-channel and omitting reception on other sub-channels.

10. The apparatus of claim 9, wherein the plurality of messages and the discovery message are present simultaneously on the parallel sub-channels.

11. The apparatus of claim 9, wherein the plurality of messages comprises at least one information type of the following information type set:

management information on the wireless network and data.

12. The apparatus of claim 9, wherein the discovery message comprises a narrowband indicator indicating transmission timing reserved for narrowband transmission on the channel.

13. The apparatus of claim 9, wherein the plurality of messages comprises a plurality of different types of management information.

14. The apparatus of claim 9 wherein said determining comprises detecting, by the apparatus, the at least one content notification message indicating at least a first content type of a first message on the first sub-channel and a second content type of a second message on the second sub-channel, wherein the second content type is different from the first content type, wherein the first message and the second message are scheduled to be transferred at least partially simultaneously, wherein the first sub-channel and the second sub-channel are frequency sub-channels of the channel; and wherein said selecting comprises selecting autonomously by the apparatus, a preferred sub-channel, wherein the selection is based on the first content type and the second content type indicated in the determined at least one content notification message.

15. The apparatus of claim 9, wherein said autonomous selection by the apparatus is further based on a selection criterion internal to the apparatus.

16. The apparatus of claim 15, wherein the selection criterion comprises at least one selection criterion of the following selection criterion set:

the apparatus has buffered uplink data for uplink transmission and one of the plurality of messages indicates uplink transmission timing;

the apparatus has no knowledge of a current value of a determined parameter of the wireless network and one of the plurality of messages comprises said determined parameter;

one of the plurality of messages comprises data addressed to the apparatus;

the apparatus determines to cheek a downlink data transmission timing schedule;

one of the plurality of messages comprises a traffic indication bitmap for a group of terminal devices to which the apparatus belongs; and the apparatus determines to check whether or not the traffic indication map indicates presence of downlink data buffered for the apparatus.

17. The apparatus of claim 9, wherein the at least one memory and the computer program code are configured, with the at least one processor, to cause the apparatus to:

detect a second content notification message comprising indications of contents of each of a second set of messages frequency-multiplexed with a second discovery message to said parallel sub-channels of the channel;

select autonomously the second sub-channel different from said first sub-channel on the basis of the determined at least one content notification message; and acquire a message through the selected second sub-channel.

18. An apparatus comprising:

at least one processor; and at least one memory including a computer program code, wherein the at least one memory and the computer program code are configured, with the at least one processor, to cause the apparatus to:

determine to frequency-multiplex a plurality of messages with a discovery message to parallel sub-channels of a channel of a bi-directional wireless network, wherein the plurality of messages are different from the discovery message;

generate at least one content notification message indicating comprising indications of contents of each of the plurality of messages and causing transmission of the content notification message in the bi-directional wireless network; and cause transmission of the discovery message as on a first sub-channel, wherein the discovery message on the first sub-channel is frequency-multiplexed with the plurality of messages on sub-channels other than the first sub-channel, and wherein the transmission causes reception of a message different from the discovery message on a second sub-channel and omission of a reception on other sub-channels.

19. The apparatus of claim 18, wherein the at least one memory and the computer program code are configured, with the at least one processor, to cause the apparatus to cause transmission of the plurality of messages and the discovery message simultaneously on the parallel sub-channels.

20. The apparatus of claim 18, wherein the plurality of messages comprises a plurality of different types of management information.

\* \* \* \* \*

UNITED STATES PATENT AND TRADEMARK OFFICE
CERTIFICATE OF CORRECTION

Page 1 of 1

PATENT NO. : 10,693,618 B2
APPLICATION NO. : 15/763655
DATED : June 23, 2020
INVENTOR(S) : Enrico-Henrik Rantala et al.

It is certified that error appears in the above-identified patent and that said Letters Patent is hereby corrected as shown below:

In the Claims

In Claim 16:
Column 20, Line 13, "cheek" should be deleted and --check-- should be inserted.

In Claim 18:
Column 20, Lines 47-48, "indicating" should be deleted.
Column 20, Line 52, "as" should be deleted.

Signed and Sealed this
Eleventh Day of August, 2020

Andrei Iancu
*Director of the United States Patent and Trademark Office*